(12) United States Patent
Watanabe et al.

(10) Patent No.: US 11,317,629 B2
(45) Date of Patent: *May 3, 2022

(54) LIQUID COMPOSITION COMPRISING MEFENTRIFLUCONAZOLE

(71) Applicant: SUMITOMO CHEMICAL COMPANY, LIMITED, Tokyo (JP)

(72) Inventors: Atsushi Watanabe, Takarazuka (JP); Yoshinao Sada, Kasai (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,103

(22) Filed: Jun. 3, 2020

(65) Prior Publication Data

US 2020/0375181 A1  Dec. 3, 2020

Related U.S. Application Data

(63) Continuation-in-part of application No. 16/507,619, filed on Jul. 10, 2019, now abandoned.

(30) Foreign Application Priority Data

May 31, 2019 (JP) .............................. JP2019-102242

(51) Int. Cl.
*A01N 25/04* (2006.01)
*A01N 43/653* (2006.01)
*A01N 61/02* (2006.01)

(52) U.S. Cl.
CPC ........... *A01N 43/653* (2013.01); *A01N 25/04* (2013.01); *A01N 61/02* (2013.01)

(58) Field of Classification Search
CPC ....... A01N 43/653; A01N 61/02; A01N 25/04
See application file for complete search history.

(56) References Cited

U.S. PATENT DOCUMENTS

| | | | | |
|---|---|---|---|---|
| 2014/0155262 A1* | 6/2014 | Dietz | ................... | C07D 249/08 504/100 |
| 2017/0127668 A1* | 5/2017 | Berg | ..................... | A01N 25/30 |

FOREIGN PATENT DOCUMENTS

| CN | 106359395 A | 2/2017 |
|---|---|---|
| EP | 2839745 A1 | 2/2015 |
| JP | 2014-94909 A | 5/2014 |
| WO | WO 2013/162725 A1 | 10/2013 |
| WO | WO 2017/102905 A1 | 6/2014 |
| WO | WO 99/26472 A1 | 2/2017 |

OTHER PUBLICATIONS

Chem-Oil 83 Product Label ("Crop Oil Concentrate Spray Tank Adjuvant for Pesticides" Coastal AgroBusiness, Inc. Greenville, North Carolina. (Jul. 8, 2017). (Year: 2017).*
English translation of the Written Opinion of the International Searching Authority, dated Aug. 25, 2020, for International Application No. PCT/JP2020/021216.
International Search Report, dated Aug. 25, 2020, for International Application No. PCT/JP2020/021216.
Agri-Dex Product Label, Helena Holding Company, 2014, Accessed from https://s3-us-west-1.amazonsws.com/agrain-cg-fs1-production/pdfs/Agri-Dex_Label11.pdf on Sep. 5, 2019 (2 pages total).
DeBoer et al., "Use of Uptake Spraying Oil to Improve Fungicidal Activity of the Triazole Fungicide Fentuxonancle on Puccinia Iritione and Puccinia strifomis Rusts of Wheat," Plant Management Network, May 28, 2013, Accessed from https://www.plantmanagementnetwork.org/pub/php/research/2013/wheat/wheat.pdf on Sep. 4, 2019 (9 pages total).
GRDC, "Adjuvants—Oils, surfactants and other additives for farm chemicals," Australian Government, Grains Research and Development Corporation, 2012, pp. 1-48 (52 pages total).

* cited by examiner

*Primary Examiner* — Jeffrey S Lundgren
*Assistant Examiner* — Chris E Simmons
(74) *Attorney, Agent, or Firm* — Birch, Stewart, Kolasch & Birch, LLP

(57) ABSTRACT

An object of the present invention is to provide a composition which is excellent in plant disease control effect. A liquid composition comprising an effective amount of mefentrifluconazole, 0.1 to 10% by volume of an oil adjuvant, and water.

4 Claims, No Drawings

LIQUID COMPOSITION COMPRISING MEFENTRIFLUCONAZOLE

CROSS REFERENCE TO RELATED APPLICATIONS

This application is a Continuation-in-Part of co-pending application Ser. No. 16/507,619, filed on Jul. 10, 2019, which claims the benefit under 35 U.S.C. § 119(a) to Application No. 2019-102242, filed in Japan on May 31, 2019, all of which are hereby expressly incorporated by reference into the present application.

BACKGROUND OF THE INVENTION

Field of the Invention

The present invention relates to a liquid composition for controlling plant diseases, which comprises mefentrifluconazole.

Description of the Related Art

Conventionally, mefentrifluconazole is known as an active ingredient for a plant disease control agent (for example, refer to US 2014/0155262 and WO 2017/102905).

CITATION LIST

Patent Documents

Patent Document 1: US-2014-0155262-A1
Patent Document 2: WO 2017/102905-A1

SUMMARY OF THE INVENTION

An object of the present invention is to provide a composition which is excellent in plant disease control effect.

The present inventors have intensively studied so as to find a composition excellent in plant disease control effect, and found that a liquid composition comprising mefentrifluconazole, an oil adjuvant, and water and having a concentration of the oil adjuvant within a specific range shows a synergistic effect and is excellent in plant disease control effect.

More specifically, the present invention is as described below.
[1] A liquid composition comprising an effective amount of mefentrifluconazole, 0.1 to 10% by volume of an oil adjuvant, and water.
[2] The liquid composition according to [1], wherein the oil adjuvant is Crop Oil Concentrates (COC), Methylated Seed Oils (MSO), or High Surfactant Oil Concentrates (HSOC).
[3] The liquid composition according to [1], wherein a concentration of mefentrifluconazole is 2000 to 10000 ppm.
[4] The liquid composition according to [1], wherein the concentration of the oil adjuvant is 1.25 to 10% by volume.
[5] A method for controlling plant diseases, comprising the steps of mixing a mefentrifluconazole-containing formulation, an oil adjuvant, and water to prepare a liquid composition comprising an effective amount of mefentrifluconazole, 0.1 to 10% by volume of an oil adjuvant, and water; and applying the liquid composition to a plant or soil for cultivating the plant.

Plant diseases can be controlled according to the present invention.

DETAILED DESCRIPTION OF THE PREFERRED EMBODIMENTS

The liquid composition according to the present invention (hereinafter referred to as the composition of the present invention) comprises an effective amount of mefentrifluconazole.

Mefentrifluconazole is a known compound and described, for example, in US Patent Application Publication No. 2014/0155262 A and WO 2017/102905. Mefentrifluconazole can be synthesized by the method as described in US Patent Application Publication No. 2014/0155262 A and WO 2017/102905.

The concentration of mefentrifluconazole in the composition of the present invention is usually 100 to 10000 ppm, preferably 500 to 8000 ppm, more preferably 1000 to 7000 ppm, and most preferably 2000 to 6000 ppm. Specific concentrations of mefentrifluconazole includes 150 ppm, 300 ppm, 500 ppm, 800 ppm, 1500 ppm, 3000 ppm, 5000 ppm, and 8000 ppm.

The composition of the present invention can include mefentrifluconazole in the solid state. That is, the composition of the present invention can be an aqueous suspension which includes mefentrifluconazole in the solid state, oil adjuvant, and water.

The composition of the present invention comprises an oil adjuvant. Adjuvants are generally known as substances to be added to enhance the action of pesticides or to modify the physical properties of mixtures for spraying (spray liquid). As used herein, the oil adjuvant refers to oil-containing adjuvants, which contain a surfactant to emulsify oil when they are mixed with water. Oil adjuvants are classified according to the type of oil, the type of surfactant, and contents thereof. Examples of oils contained in oil adjuvants include mineral oils and vegetable oils. Mineral oils are oils of minerals such as petroleum, and contain a mixture of hydrocarbons. Examples of the hydrocarbons include paraffinic hydrocarbons, naphthenic hydrocarbons, aromatic hydrocarbons, other unsaturated hydrocarbons and combinations thereof. Vegetable oils are oils extracted from seeds, and examples of the seeds include seeds of corn, cotton, peanut, rapeseed, sunflower, canola and soybean. The vegetable oil may be a vegetable oil that has been modified such as methylation. Examples of oil adjuvants include COC, HSOC, and MSO. Generally, COC are known as adjuvants classified as Crop Oil Concentrates (COC), and, as used herein, refer to oil adjuvants containing an oil containing a paraffinic hydrocarbon, and a surfactant, wherein the total content of the oil is at least 80% by weight and the total content of the surfactant is 5 to 20% by weight. In general, HSOC are known as adjuvants classified as High Surfactant Oil Concentrates (HSOC), and, as used herein, refer to oil adjuvants containing an oil and a surfactant, wherein the total content of the oil is at least 50% by weight and the total content of the surfactant is 25 to 50% by weight. In addition, MSO are generally known as adjuvants classified as Methylated Seed Oils (MSO), and, as used herein, refer to oil adjuvants containing a methylated vegetable oil, wherein the total content of the methylated vegetable oil is at least 40% by weight. Examples of commercially available COC include Agri-Dex (manufactured by Helena), Crop Oil Concentrate (manufactured by Helena), Herbimax (manufactured by Loveland), Ortech (manufactured by Rosens), Premium Crop Oil (manufactured by United Suppliers), Premium COC (manufactured by West Central), Prime Oil (manufactured by Winfield), Protyx Aerial (manufactured by Precision Laboratories), and ROC Crop Oil (manufactured by Wilbur-Ellis). Examples of commercially available HSOC include Between (manufactured by United Suppliers), Destiny (manufactured by Winfield), Diplomat (manufactured by Rosens), Exchange (manufactured by Precision Laboratories), Hi-Load (manufactured by Simplot), High Load (manufactured by Wilbur-Ellis), Kixyt (manufactured by Precision Laboratories), Savvy (manufactured by West Central), Stake (manufactured by West Central), and Superb HC (manufactured by Winfield). Examples of commercially available MSO include Adigor (manufactured by Syngenta), MSO Leci-Tech (manufactured by Loveland), MSO Ultra (manufactured by Precision Laboratories), Persist Ultra (manufactured by J. R. Simplot), Premium MSO (manufactured by Helena), Soy-Stik (manufactured by West Central), Succeed (manufactured by United Suppliers), Sundance II (manufactured by Rosens), Superspread MSO (manufactured by Wilbur-Ellis), and Upland MSO (manufactured by West Central).

The composition of the present invention usually comprises 0.1 to 10% by volume, preferably 0.2 to 10% by volume, 1 to 10% by volume or 1 to 7% by volume of an oil adjuvant. When the oil adjuvant is COC, the concentration of COC in the composition of the present invention is usually 0.2 to 10% by volume, preferably 0.4 to 10% by volume, 2 to 10% by volume, 2 to 7% by volume or 2 to 6% by volume. When the oil adjuvant is HSOC, the concentration of HSOC in the composition of the present invention is usually 0.1 to 5% by volume, preferably 0.2 to 5% by volume, 1 to 5% by volume or 1 to 3.5% by volume. When the oil adjuvant is MSO, the concentration of MSO in the composition of the present invention is 0.1 to 10% by volume, preferably 1 to 10% by volume or 1 to 7% by volume. Specific percentages by volume of an oil adjuvant includes 0.15%, 0.3%, 0.5%, 0.75%, 1.25%, 1.5%, 3%, 6%, and 8%. Further, the weight ratio of mefentrifluconazole to the oil adjuvant in the composition of the present invention is preferably in the range of 1:0.1 to 1:650 or 1:10 to 1:160. When the oil adjuvant is COC, the weight ratio of mefentrifluconazole to COC in the composition of the present invention is preferably in the range of 1:0.2 to 1:650, 1:0.2 to 1:160 or 1:2 to 1:100. When the oil adjuvant is HSOC, the weight ratio of mefentrifluconazole to HSOC in the composition of the present invention is preferably in the range of 1:0.1 to 1:300, 1:0.1 to 1:100 or 1:1 to 1:60. When the oil adjuvant is MSO, the weight ratio of mefentrifluconazole to MSO in the present composition is preferably in the range of 1:0.1 to 650, or 1:10 to 1:160.

The composition of the present invention comprises water. As the water, water generally used to prepare a mixture for spraying in ordinary pesticide spraying is used.

The composition of the present invention is prepared by mixing a mefentrifluconazole-containing formulation, an oil adjuvant, and water. The formulation type of the mefentrifluconazole-containing formulation may be any formulation type as long as the formulation is generally mixed with water to prepare a mixture for spraying (spray liquid) so that the mixture is sprayed. Examples of such formulation types include emulsifiable concentrates, wettable powders, water dispersible granules, and SC (suspension concentrates), and SC are preferred. The mefentrifluconazole-containing formulation can be prepared by methods known per se for the preparation of pesticide formulations, for example by mixing mefentrifluconazole, inert carriers, and surfactants, and, optionally further other auxiliary agents for formulation.

Examples of the inert carriers used in the preparation of the mefentrifluconazole-containing formulation include solid carriers and liquid carriers. Examples of solid carriers include mineral fine powder. Examples of liquid carriers include organic solvents and water. Examples of the surfactants include anionic surfactants, nonionic surfactants, and cationic surfactants. Examples of other auxiliary agents for formulation include thickeners, preservatives, and colorants.

The composition of the present invention is prepared by adjusting the amounts of the mefentrifluconazole-containing formulation, the oil adjuvant, and water, such that each of the concentrations of mefentrifluconazole and the oil adjuvant in the composition of the present invention falls within the above ranges, and mixing them.

The composition of the present invention may further comprise one or more other fungicides and/or insecticides, and the mefentrifluconazole-containing formulation may comprise fungicides and/or insecticides other than mefentrifluconazole.

Plant diseases can be controlled by applying the composition of the present invention to a plant or soil for cultivating the plant. Especially, without significantly increasing phytotoxicity, plant diseases can be controlled by applying the composition of the present invention.

Examples of the plant diseases that can be controlled by the present invention include the following plant diseases.

Rice diseases: blast (*Magnaporthe grisea*), brown spot (*Cochliobolus miyabeanus*), sheath blight (*Rhizoctonia solani*), and bakanae disease (*Gibberella fujikuroi*);

Wheat diseases: powdery mildew (*Erysiphe graminis*), Fusarium Head blight (*Fusarium graminearum, F. avenaceum, F. culmorum, Microdochium nivale*), rust (for example, yellow rust (*Puccinia striiformis*), black rust (*P. graminis*), Brown rust (*P. recondita*)), snow mold (*Micrdochium nivale*), *Typhula* snow blight (*Typhula* sp.), loose smut (*Ustilago tritici*), stinking smut (*Tilletia caries*), eyespot (*Pseudocercosporella herpotrichoides*), *Septoria* leaf blotch (*Mycosphaerella graminicola*), glume blotch (*Stagonospora nodorum*), and tan spot (*Pyrenophora tritici-repentis*);

Barley diseases: powdery mildew (*Erysiphe graminis*), loose smut (*Fusarium graminearum, F. avenaceum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and damping-off caused by *Rhizoctonia* fungus (*Rhizoctonia solani*);

Corn diseases: smut (*Ustilago maydis*), southern leaf blight (*Cochliobolus heterostrophus*), zonate leaf spot (*Gloeocercospora sorghi*), southern rust (*Puccinia polysora*), gray leaf spot (*Cercospora zeae-maydis*), and damping-off caused by *Rhizoctonia* fungus (*Rhizoctonia solani*);

Citrus diseases: melanose (*Diaporthe citri*), scab (*Elsinoe fawcetti*), and fruit rot (*Penicillium digitatum, P. italicum*);

Apple diseases: blossom blight (*Monilinia mali*), canker (*Valsa ceratosperma*), powdery mildew (*Podosphaera leucotricha*), *Alternaria* leaf spot (*Alternaria alternata* apple pathotype), scab (*Venturia inaequalis*), and bitter rot (*Colletotrichum acutatum*);

Pear diseases: scab (*Venturia nashicola, V. pirina*), black spot (*Alternaria* alternata Japanese pear pathotype), rust (*Gymnosporangium haraeanum*), and brown spot (*Stemphilium vesicarium*);

Peach diseases: brown rot (*Monilinia fructicola*), scab (*Cladosporium carpophilum*), and *Phomopsis* rot (*Phomopsis* sp.);

Grapes diseases: anthracnose (*Elsinoe ampelina*), ripe rot (*Glomerella cingulata*), powdery mildew (*Uncinula necator*), rust (*Phakopsora ampelopsidis*), and black rot (*Guignardia bidwellii*);

Diseases of Japanese persimmon: anthracnose (*Gloeosporium kaki*), and leaf spot (*Cercospora kaki, Mycosphaerella nawae*);

Diseases of Cucurbitaceae: anthracnose (*Colletotrichum lagenarium*), powdery mildew (*Sphaerotheca fuliginea*), gummy stem blight (*Mycosphaerella melonis*), and *Fusarium* wilt (*Fusarium oxysporum*);

Tomato diseases: early blight (*Alternaria solani*), and leaf mold (*Cladosporium fulvum*);

Eggplant disease: brown spot (*Phomopsis vexans*), and powdery mildew (*Erysiphe cichoracearum*);

Diseases of brassica plants: *Alternaria* leaf spot (*Alternaria japonica*), white spot (*Cercosporella brassicae*), and clubroot (Plasmodiophora brassicae);

Welsh onion diseases: rust (*Puccinia allii*).

Soybean diseases: purple stain (*Cercospora kikuchii*), Sphaceloma scad (*Elsinoe glycines*), pod and stem blight (*Diaporthe phaseolorum* var. *sojae*), *Septoria* brown spot (*Septoria glycines*), *Cercospora* leaf spot (*Cercospora sojina*), rust (*Phakopsora pachyrhizi*), damping-off caused by *Rhizoctonia* fungus (*Rhizoctonia solani*), target spot (*Corynespora casiicola*), and *Clerotinia* rot (*Sclerotinia sclerotiorum*);

Kidney bean diseases: anthracnose (*Colletotrichum lindemthianum*);

Peanut diseases: leaf spot (*Cercospora personata*), brown leaf spot (*Cercospora arachidicola*), and southern blight (*Sclerotium rolfsii*);

Garden pea diseases: powdery mildew (*Erysiphe pisi*);

Potato diseases: early blight (*Alternaria solani*), pink rot (*Phytophthora erythroseptica*), and powdery scab (*Spongospora subterranean* f. sp. *subterranea*);

Strawberry diseases: powdery mildew (*Sphaerotheca humuli*), and anthracnose (*Glomerella cingulata*);

Tea diseases: net blister blight (*Exobasidium reticulatum*), white scab (*Elsinoe leucospila*), gray blight (*Pestalotiopsis* sp.), and anthracnose (*Colletotrichum theae-sinensis*);

Tobacco diseases: brown spot (*Alternaria longipes*), powdery mildew (*Erysiphe cichoracearum*), and anthracnose (*Colletotrichum tabacum*);

Rape seed diseases: *Sclerotinia* rot (*Sclerotinia sclerotiorum*), and rape seed damping-off caused by *Rhizoctonia solani* (*Rhizoctonia solani*);

Cotton diseases: cotton damping-off caused by *Rhizoctonia solani* (*Rhizoctonia solani*);

Sugar beet diseases: *Cercospora* leaf spot (*Cercospora beticola*), leaf blight (*Thanatephorus cucumeris*), root rot (*Thanatephorus cucumeris*), and *Aphanomyces* root rot (*Aphanomyces cochlioides*);

Rose diseases: blackspot (*Diplocarpon rosae*), and powdery mildew (*Sphaerotheca pannosa*);

Diseases of chrysanthemum and Asteraceae plants: leaf blight (*Septoria chrysanthemi-indici*), and white rust (*Puccinia horiana*);

Various plants diseases: Gray mold (*Botrytis cinerea*), and *Sclerotinia* rot (*Sclerotinia sclerotiorum*);

Japanese radish diseases: *Alternaria* leaf spot (*Alternaria brassicicola*);

Turfgrass diseases: dollar spot (*Sclerotinia homeocarpa*), brown patch, and large patch (*Rhizoctonia solani*);

Banana diseases: Sigatoka disease (*Mycosphaerella fijiensis, Mycosphaerella musicola*);

Seed diseases or diseases in the early stages of the growth of various plants caused by bacteria of *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp., *Diplodia* spp.; and Viral diseases of various plants mediated by *Polymixa* spp. or *Olpidium* spp.

Examples of plants to which the composition of the present invention can be applied include the following plants.

Crops: corn, rice, wheat, barley, rye, oat, sorghum, cotton, soybean, azuki bean, kidney bean, peanut, buckwheat, sugar beet, rapeseed, sunflower, sugar cane, tobacco, and the others;

Vegetables: Solanaceous vegetables (for example, eggplant, tomato, green pepper, hot pepper, or potato), Cucurbitaceous vegetables (for example, cucumber, pumpkin, zucchini, watermelon, melon, or squash), Cruciferous vegetables (for example, Japanese radish, white turnip, horseradish, kohlrabi, Chinese cabbage, cabbage, leaf mustard, broccoli, or cauliflower), Asteraceous vegetables (for example, burdock, garland chrysanthemum, artichoke, or lettuce), Liliaceous vegetables (for example, welsh onion, onion, garlic, or asparagus), Ammiaceous vegetables (for example, carrot, parsley, celery, or parsnip), Chenopodiaceous vegetables (for example, spinach, or Swiss chard), Lamiaceous vegetables (for example, perilla, mint, or basil), strawberry, sweet potato, glutinous yam, eddo, and the others;

Flowers;

Foliage plants;

Turfgrass;

Fruits: pomaceous fruits (for example, apple, common pear, Japanese pear, Chinese quince, or quince), stone fleshy fruits (for example, peach, plum, nectarine, Japanese apricot (Prunus mume), cherry fruit, apricot, or prune), citrus plants (for example, Citrus unshiu, orange, lemon, lime, or grapefruits), nuts (for example, chestnuts, walnuts, hazel nuts, almond, pistachio, cashew nuts, or macadamia nuts), berry fruits (for example, blueberry, cranberry, blackberry, or raspberry), grapes, Japanese persimmon, olive, loquat, banana, coffee, date palm, coconuts, and the others; and Trees other than fruit trees: tea, mulberry, flowering plants, street trees (for example, ash tree, birch, dogwood, eucalyptus, ginkgo (*Ginkgo biloba*), lilac, maple tree, oak (*quercus*), poplar, cercis, Formosan gum (Liquidambar formosana), plane tree, zelkova, Japanese arborvitae (*Thuja standishii*), Japanese fir, hemlock, juniper, pinus, spruce, or yew (*Taxus cuspidate*)), and the others.

Also, the plants may be plants provided with tolerance by gene recombination technology.

The method for controlling plant diseases according to the present invention (hereinafter referred to as the method of the present invention) includes the steps of: mixing a mefentrifluconazole-containing formulation, an oil adjuvant, and water to prepare the composition of the present invention; and applying the composition of the present invention to a plant or soil for cultivating the plant. The step of preparing the composition of the present invention is performed by the method described above. The step of applying the composition of the present invention is carried out by ground application or aerial application. In the step of applying the composition of the present invention, the composition of the present invention is applied with a ground sprayer, an aerial equipment or through a sprinkler irrigation equipment.

The application rate of the composition of the present invention in the method of the present invention may be varied depending on a type of plant, a type or a frequency of an occurrence of plant diseases to be controlled, a formulation type, an application period, an application method, an application site, a climate condition and the like. The application rate of the composition of the present invention is usually 10 to 100 g per hectare as an amount of mefentrifluconazole.

EXAMPLES

Hereinafter, the present invention will be described in more detail by test examples.

Formulation Example

Ten (10) parts by weight of mefentrifluconazole, 6 parts by weight of a mixture of 40% polyoxyethylene tristyryl phenyl ether phosphate and 60% propylene glycol (SOPROPHOR FLK, manufactured by Solvay), 0.2 parts by weight of silicone-based antifoaming agent (XIAMETER ACP-1500, manufactured by Toray Dow Corning), and 70.5 parts by weight of ion-exchanged water were mixed to obtain a mixture. The mixture and beads twice the weight of the mixture were placed in a container and then the container was set into a planetary centrifugal mixer (Awatori Rentaro, manufactured by THINKY CORPORATION) and the mixture was stirred for wet grinding, thereby obtaining 86.7 parts by weight of a suspension. 0.2 parts by weight of xanthan gum (KELZAN S, manufactured by CP Kelco), 0.4 parts by weight of magnesium aluminum silicate (VEEGUM R, manufactured by R. T. Vanderbilt Company, Inc.), 5 parts by weight of propylene glycol (manufactured by Adeka), and 7.7 parts by weight of ion-exchanged water were mixed to obtain 13.3 parts by weight of a thickener-containing liquid.

86.7 parts by weight of the suspension and 13.3 parts by weight of the thickener-containing liquid were mixed to obtain SC comprising 10% by weight of mefentrifluconazole (hereinafter referred to as mefentrifluconazole SC).

Efficacy Test Example 1

Liquid compositions comprising 150 ppm of mefentrifluconazole, 2 or 6% by volume of an oil adjuvant and water (hereinafter referred to as Present Composition 1 and Present Composition 2) were prepared by diluting mefentrifluconazole SC and an oil adjuvant (COC: Agri-Dex, containing 82% of heavy range paraffinic oil, 17% of surfactant, and 1% of other components, manufactured by Helena), respectively, with water and mixing them. Similarly, mefentrifluconazole SC and an oil adjuvant were each diluted with water to prepare a liquid composition comprising 150 ppm of mefentrifluconazole and water (hereinafter referred to as Comparative Composition 1), a liquid composition comprising 2% by volume of an oil adjuvant and water (hereinafter referred to as Comparative Composition 2), and a liquid composition comprising 6% by volume of an oil adjuvant and water (hereinafter referred to as Comparative Composition 3), respectively.

A soil was filled into a plastic pot, and wheat (variety: Shirogane) was seeded therein, and grown in a greenhouse for 10 days. The prepared liquid compositions were each sprayed to the foliage of wheat such that the application rate would be 200 L/ha. After spraying, the plant was air-dried, and an aqueous suspension of spores of Brown rust (*P. recondita*) was inoculated by spraying it. After inoculating, the plant was placed at 23° C. under high humidity for 1 day and subsequently placed under illumination for 10 days, then the lesion area was investigated (lesion area in the treated area).

On the other hand, in the non-treated area, the same operation as in the treated area was carried out except that the liquid composition was not sprayed, and the lesion area of Brown rust in the non-treated area was investigated (lesion area in the non-treated area).

From the lesion area in each of the treated area and the non-treated area, the efficacy of the treated area was determined according to the following "Formula 1".

The results are indicated in Table 1.

Efficacy (%)=[1−(lesion area in the treated area/lesion area in the non-treated area)]×100          Formula (1)

TABLE 1

| | Concentration of mefentrifluconazole in composition (ppm) | Concentration of oil adjuvant in composition (% by volume) | Efficacy (%) | Efficacy improvement |
|---|---|---|---|---|
| Present Composition 1 | 150 | 2 | 100 | 40 points |
| Present Composition 2 | 150 | 6 | 100 | 40 points |
| Comparative Composition 1 | 150 | — | 60 | |
| Comparative Composition 2 | — | 2 | 0 | |
| Comparative Composition 3 | — | 6 | 0 | |

Efficacy Test Example 2

Liquid compositions comprising 500 or 1000 ppm of mefentrifluconazole, 2 or 6% by volume of an oil adjuvant and water (hereinafter referred to as Present Composition 3, Present Composition 4, Present Composition 5, and Present Composition 6) were prepared by diluting mefentrifluconazole SC and an oil adjuvant (COC: Agri-Dex, containing 82% of heavy range paraffinic oil, 17% of surfactant, and 1% of other components, manufactured by Helena), respectively, with water and mixing them. Similarly, mefentrifluconazole SC was alone diluted with water to prepare a liquid composition comprising 500 or 1000 ppm of mefentrifluconazole and water (hereinafter referred to as Comparative Composition 4 and Comparative Composition 5). As a comparison, the same operation was made by replacing mefentrifluconazole SC with fenbuconazole SC (hereinafter referred to as Comparative Composition 6, Comparative Composition 7, Comparative Composition 8, Comparative Composition 9, Comparative Composition 10, and Comparative Composition 11). Fenbuconazole SC was purchased from a public source as Indar Flowable (22% fenbuconazole) manufactured by Dow Agrosciences Japan KK.

A soil was filled into a plastic pot, and wheat (variety: Apogee) was seeded therein, and grown in a greenhouse for 45 days, and an aqueous suspension of spores of *Septoria tritici* was inoculated by spraying it. After spraying, the plant was placed at 15° C. under high humidity for 1 day and subsequently placed under illumination for 6 days. The prepared liquid compositions were each sprayed to the foliage of wheat such that the application rate would be 100 L/ha. The sprayed plant was placed for further 17 days, then the lesion area was investigated (lesion area in the treated area).

On the other hand, in the non-treated area, the same operation as in the treated area was carried out except that the liquid composition was not sprayed, and the lesion area of *Septoria* tritici in the non-treated area was investigated (lesion area in the non-treated area).

From the lesion area in each of the treated area and the non-treated area, the efficacy of the treated area was determined according to the above "Formula 1".

The results are indicated in Table 2.

tion 11 and Present Composition 12) were prepared by replacing Agri-Dex with Destiny (HSOC, containing 50% of methylated seed oil, 42% of sorbitan fatty acid esters and high fructose corn syrup, and 8% of other ingredients). Similarly, mefentrifluconazole SC was alone diluted with water to prepare a liquid composition comprising 10,000 ppm of mefentrifluconazole and water (hereinafter referred to as Mefentrifluconazole no-adjuvant 10). As a comparison, the same operation was made by replacing mefentrifluconazole SC with fenbuconazole SC (hereinafter referred to as Comparative Composition 12, Comparative Composition 13, Comparative Composition 14, Comparative Composition 15, Comparative Composition 16, Comparative Composition 17, and Fenbuconazole no-adjuvant 10). Fenbuconazole SC was purchased from a public source as Indar Flowable (22% fenbuconazole) manufactured by Dow Agrosciences Japan KK.

A soil was filled into a plastic pot, and corn (variety: Pioneer) was seeded therein, and grown in a greenhouse for 4 days. The prepared liquid compositions were each dripped into the whorl of emerged corn plants at a rate of 20 micro

TABLE 2

| | Fungicidal active ingredient | Concentration of ingredient in composition (ppm) | Concentration of oil adjuvant in composition (% by volume) | Efficacy (%) | Efficacy improvement |
|---|---|---|---|---|---|
| Comparative Composition 4 | Mefentrifluconazole | 500 | — | 7 | — |
| Present Composition 3 | | 500 | 2 | 58 | 51 points |
| Present Composition 4 | | 500 | 6 | 74 | 67 points |
| Comparative Composition 5 | | 1000 | — | 3 | — |
| Present Composition 5 | | 1000 | 2 | 63 | 60 points |
| Present Composition 6 | | 1000 | 6 | 85 | 82 points |
| Comparative Composition 6 | Fenbuconazole | 500 | — | 17 | — |
| Comparative Composition 7 | | 500 | 2 | 25 | 8 points |
| Comparative Composition 8 | | 500 | 6 | 54 | 37 points |
| Comparative Composition 9 | | 1000 | — | 5 | — |
| Comparative Composition 10 | | 1000 | 2 | 25 | 20 points |
| Comparative Composition 11 | | 1000 | 6 | 63 | 58 points |

Phytotoxicity Test Example 1

Liquid compositions comprising 10,000 ppm of mefentrifluconazole, 1.25 or 10% by volume of an oil adjuvant and water (hereinafter referred to as Present Composition 7 and Present Composition 8) were prepared by diluting mefentrifluconazole SC and an oil adjuvant (COC: Agri-Dex, containing 82% of heavy range paraffinic oil, 17% of surfactant, and 1% of other components, manufactured by Helena), respectively, with water and mixing them. Similarly to the Present Composition 7 and 8, liquid compositions (hereinafter referred to as Present Composition 9 and Present Composition 10) were prepared by replacing Agri-Dex with Sundance II (MSO, containing 90% of methylated seed oil and 10% of alkyl and aryl alkoxylates and phosphate esters). Similarly to the Present Composition 7 and 8, liquid compositions (hereinafter referred to as Present Composiliters per plant. After dripping, the plants were placed in the greenhouse for 8 days, then the plant lengths were measured. Some plants were not dripped with any composition as a non-treated control and were handled in the same manner in the greenhouse.

From the plant lengths in each of the treated plants and the non-treated plants, the relative length of the compositions was determined according to the following "Formula 2".

The results are indicated in Table 3. Mefentrifluconazole and fenbuconazole each retarded corn plant slightly without adjuvant. However, the addition of oil adjuvants severely enhanced the retardation by fenbuconazole while the addition did seldom enhance the retardation by mefentrifluconazole.

Relative length (%)=(length of the treated plant/length of the non-treated plant)×100   Formula (2)

TABLE 3

| | Fungicidal active ingredient (10,000 ppm) | Oil adjuvant (% by volume) | Relative length (%) | Change in relative length by addition of an oil adjuvant |
|---|---|---|---|---|
| Mefentrifluconazole no-adjuvant 10 | Mefentrifluconazole | — | 97 | — |
| Present Composition 7 | | Agri-Dex (1.25) | 97 | 0 |
| Present Composition 8 | | Agri-Dex (10) | 95 | −2 |
| Present Composition 9 | | Sundance II (1.25) | 95 | −2 |
| Present Composition 10 | | Sundance II (10) | 95 | −2 |
| Present Composition 11 | | Destiny (1.25) | 95 | −2 |
| Present Composition 12 | | Destiny (10) | 92 | −5 |
| Fenbuconazole no-adjuvant 10 | Fenbuconazole | — | 97 | — |
| Comparative Composition 12 | | Agri-Dex (1.25) | 76 | −21 |
| Comparative Composition 13 | | Agri-Dex (10) | 65 | −32 |
| Comparative Composition 14 | | Sundance II (1.25) | 78 | −19 |
| Comparative Composition 15 | | Sundance II (10) | 73 | −24 |
| Comparative Composition 16 | | Destiny (1.25) | 78 | −19 |
| Comparative Composition 17 | | Destiny (10) | 76 | −21 |

Phytotoxicity Test Example 2

A liquid composition comprising 2,000 ppm of mefentrifluconazole, 10% by volume of an oil adjuvant and water (hereinafter referred to as Present Composition 13) were prepared by diluting mefentrifluconazole SC and an oil adjuvant (COC: Agri-Dex, containing 82% of heavy range paraffinic oil, 17% of surfactant, and 1% of other components, manufactured by Helena) with water and mixing them. Similarly to the Present Composition 13, a liquid compositions (hereinafter referred to as Present Composition 14) were prepared by replacing Agri-Dex with Sundance II (MSO, containing 90% of methylated seed oil and 10% of alkyl and aryl alkoxylates and phosphate esters). Similarly to the Present Composition 13, a liquid composition (hereinafter referred to as Present Composition 15) were prepared by replacing Agri-Dex with Destiny (HSOC, containing 50% of methylated seed oil, 42% of sorbitan fatty acid esters and high fructose corn syrup, and 8% of other ingredients). Similarly, mefentrifluconazole SC was alone diluted with water to prepare a liquid composition comprising 2,000 ppm of mefentrifluconazole and water (hereinafter referred to as Mefentrifluconazole no-adjuvant 2). As a comparison, the same operation was made by replacing mefentrifluconazole SC with fenbuconazole SC (hereinafter referred to as Comparative Composition 18, Comparative Composition 19, Comparative Composition 20, and Fenbuconazole no-adjuvant 2). Fenbuconazole SC was purchased from a public source as Indar Flowable (22% fenbuconazole) manufactured by Dow Agrosciences Japan KK.

A soil was filled into a plastic pot, and corn (variety: Pioneer) was seeded therein, and grown in a greenhouse for 4 days. The prepared liquid compositions were each sprayed onto the emerged corn plants at a rate of 1000 L/ha. After spraying, the plants were placed in the greenhouse for 8 days, then the plant lengths were measured. Some plants were not sprayed with any composition as a non-treated control and were handled in the same manner in the greenhouse.

From the plant lengths in each of the treated plants and the non-treated plants, the relative length of the compositions was determined according to the above "Formula 2".

The results are indicated in Table 4. Mefentrifluconazole and fenbuconazole each did not effect on plant length without adjuvant. However, the addition of oil adjuvants enhanced the retardation by fenbuconazole while the addition slightly enhance the plant length in mefentrifluconazole treatments.

TABLE 4

| Fungicidal active ingredient (2,000 ppm) | Oil adjuvant (10% by volume) | Relative length (%) | Change in relative length by addition of an oil adjuvant |
|---|---|---|---|
| Mefentrifluconazole no-adjuvant 2 | Mefentrifluconazole | — | 100 | — |
| Present Composition 13 | | Agri-Dex | 103 | +3 |
| Present Composition 14 | | Sundance II | 103 | +3 |
| Present Composition 15 | | Destiny | 103 | +3 |
| Fenbuconazole no-adjuvant 2 | Fenbuconazole | — | 100 | — |
| Comparative Composition 18 | | Agri-Dex | 92 | −8 |
| Comparative Composition 19 | | Sundance II | 92 | −8 |
| Comparative Composition 20 | | Destiny | 89 | −11 |

What is claimed is:

1. A liquid composition comprising 500 to 8000 ppm of mefentrifluconazole, 0.3 to 8% by volume of an oil adjuvant, and water, wherein a weight ratio of mefentrifluconazole to the oil adjuvant is within a range of 1:1.25 to 1:160.

2. The liquid composition according to claim 1, wherein the oil adjuvant is Crop Oil Concentrates (COC), Methylated Seed Oils (MSO), or High Surfactant Oil Concentrates (HSOC).

3. The liquid composition according to claim 1, wherein the oil adjuvant is Crop Oil Concentrates (COC) or Methylated Seed Oils (MSO).

4. A method for controlling plant diseases with the liquid composition according to claim 1, comprising the steps of mixing a mefentrifluconazole-containing formulation, said oil adjuvant, and water to prepare the liquid composition according to claim 1 comprising said 500 to 8000 ppm of mefentrifluconazole, 0.3 to 8% by volume of said oil adjuvant, and water, wherein a weight ratio of mefentrifluconazole to the oil adjuvant is within a range of 1:1.25 to 1:160; and applying the liquid composition to a plant or soil for cultivating the plant.

* * * * *